United States Patent
Steinemann et al.

(10) Patent No.: US 10,235,420 B2
(45) Date of Patent: Mar. 19, 2019

(54) BUCKET SKIPLISTS

(71) Applicant: SAP SE, Walldorf (DE)

(72) Inventors: Peter Steinemann, Mannheim (DE); Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 84 days.

(21) Appl. No.: 15/634,243

(22) Filed: Jun. 27, 2017

(65) Prior Publication Data

US 2017/0293661 A1    Oct. 12, 2017

Related U.S. Application Data

(63) Continuation of application No. 14/570,509, filed on Dec. 15, 2014, now Pat. No. 9,747,315.

(51) Int. Cl.
*G06F 17/30* (2006.01)

(52) U.S. Cl.
CPC .. *G06F 17/30528* (2013.01); *G06F 17/30321* (2013.01); *G06F 17/30501* (2013.01)

(58) Field of Classification Search
CPC ......... G06F 17/30528; G06F 17/30321; G06F 17/30501; G06F 17/30958
USPC ....... 707/769, 790, 791, 793, 796, 800, 801, 707/803
See application file for complete search history.

(56) References Cited

U.S. PATENT DOCUMENTS

| | | | |
|---|---|---|---|
| 5,659,739 A | 8/1997 | Lubbers et al. | |
| 5,664,179 A * | 9/1997 | Tucker | G06F 17/30958 |
| 5,671,406 A * | 9/1997 | Lubbers | G06F 7/24 |
| | | | 707/696 |
| 7,287,131 B1 * | 10/2007 | Martin | G06F 17/30949 |
| | | | 707/999.101 |
| 7,370,054 B1 * | 5/2008 | Martin | G06F 17/30949 |
| | | | 707/747 |
| 7,424,477 B1 | 9/2008 | Martin et al. | |
| 8,195,643 B2 | 6/2012 | Weyerhaeuser et al. | |
| 2004/0107346 A1 * | 6/2004 | Goodrich | H04L 9/3236 |
| | | | 713/176 |

(Continued)

OTHER PUBLICATIONS

Skip list, http://en.wikipedia.org/w/index.php?title=Skip_list&oldid=633428368 (last visited Dec. 15, 2014).

(Continued)

*Primary Examiner* — Hares Jami
(74) *Attorney, Agent, or Firm* — Fish & Richardson P.C.

(57) ABSTRACT

The present disclosure involves systems, software, and computer implemented methods for providing a bucket skiplist. In one example, a method comprises identifying a value to be searched for within a skiplist comprising a data structure for referencing a plurality of ordered nodes, the data structure having a plurality of linked lists, each node representing at least one memory block, wherein each node is associated with a bucket including a set of ordered values, where the first value in each bucket of each node is the relatively lowest value in the bucket, comparing the value to the first values in each bucket to identify a particular node in which the first value may be located, and, in response to determining that the first value of the particular node is not the same as the value to be searched, comparing the value to be searched with the ordered values in the bucket.

16 Claims, 6 Drawing Sheets

(56) References Cited

U.S. PATENT DOCUMENTS

| | | | |
|---|---|---|---|
| 2010/0049935 A1* | 2/2010 | Pichumani | G06F 17/30516 711/165 |
| 2011/0087707 A1* | 4/2011 | Abraham | G06F 17/30994 707/802 |
| 2012/0136871 A1 | 5/2012 | Soulard et al. | |
| 2012/0221549 A1 | 8/2012 | Weyerhaeuser et al. | |
| 2012/0303621 A1* | 11/2012 | Newnham | G06F 17/30893 707/737 |

OTHER PUBLICATIONS

Fraser, Keir; UCAM-CL-TR-579, Technical Report, No. 579, "Practical Lock-Freedom", University of Cowbridge, Computer Laboratory; Feb. 2004, 116 pages; http://www/cl.cam.ac.uk/techrports/UCAM-CL-TR-579.pdf (last visited Dec. 15, 2014).

YouTube video Lec 12 MIT 6.046J 18.410J introduction to Algorithms (SMA 5503), Fall. Http://www.youtube.com/watch?v=kBwUoWpeH_Q (last visited Dec. 15, 2014).

\* cited by examiner

BUCKET SKIPLISTS

CLAIM OF PRIORITY

This application claims priority under 35 USC § 120 to U.S. patent application Ser. No. 14/570,509, filed on Dec. 15, 2014, the entire contents of which are hereby incorporated by reference.

TECHNICAL FIELD

The present disclosure relates to computer systems and computer-implemented methods for providing a bucket skiplist.

In computer science, a skiplist is a data structure that allows fast search within an ordered sequence of elements. Fast search is made possible by maintaining a linked hierarchy of subsequences, each skipping over fewer elements. Searching starts in the sparsest subsequence until two consecutive elements have been found, one smaller and one larger than the element searched for. Through the linked hierarchy, these two elements link to elements of the next sparsest subsequence where searching is continued until finally searching in the full sequence. The elements that are skipped over may be chosen probabilistically.

Skiplists are built in layers. The bottom layer may be an ordinary ordered linked list. Each higher layer acts as an "express lane" for the lists below.

SUMMARY

The present disclosure involves systems, software, and computer-implemented methods for providing a bucket skiplist, including operations to search a bucket skiplist and to insert values into a bucket skiplist. In one example, a method comprises identifying a value to be searched for within a skiplist comprising a data structure for referencing a plurality of ordered nodes, the data structure having a plurality of linked lists, each node representing at least one memory block, wherein each node is associated with a bucket including a set of ordered values, where the first value in each bucket of each node is the relatively lowest value in the bucket, comparing the value to the first values in each bucket to identify a particular node in which the first value may be located, and, in response to determining that the first value of the particular node is not the same as the value to be searched, comparing the value to be searched with the ordered values in the bucket.

In some instances, each bucket includes a plurality of locations available to store values. In some instances, each bucket includes the same number of locations available to store values. In some instances, the value to be searched represents a value to be inserted into the skiplist. In some instances, comparing the value to be searched comprises identifying a particular location within the bucket of the particular node to insert the value to be searched.

In one instance, the identified particular location within the bucket is an empty location within the bucket of the particular node, wherein the empty location is after a relatively lower value within the bucket. The method may further comprise adding the value to be inserted into the empty location.

In one instance, the method may further comprise identifying the value to be searched as already existing within the bucket of the particular node and aborting the insertion of the value into the skiplist.

In one instance, the identified particular location within the bucket of the particular node to insert the value is between two existing values in the bucket, wherein at least one empty location within the bucket of the particular node is empty. The method may further comprise shifting the relatively higher value in the bucket to a next available location within the bucket, wherein shifting the relatively higher value in the bucket includes leaving the previous location of the relatively higher value empty, and inserting the value to be inserted into the empty previous location of the relatively higher value.

In one instance, the identified particular location within the bucket of the particular node to insert the value is between two existing values in the bucket, wherein no empty locations remain available within the bucket of the particular node. The method may further comprise identifying a location storing a relatively higher value in the bucket to initiate a bucket split, inserting a new node into the skiplist after the particular node, moving the relatively higher value and any subsequent values within the bucket into the bucket of the new node, wherein moving the relatively higher value and any subsequent values results in at least one empty location within the bucket, and inserting the value into the first empty location within the bucket. The method may further comprise adding connections to the new node in at least the lowest linked list of the skiplist.

While generally described as computer-implemented methods, some or all of the aspects may be implemented as a computer program product embodied on non-transitory, tangible media that processes and transforms the respective data, as well as included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
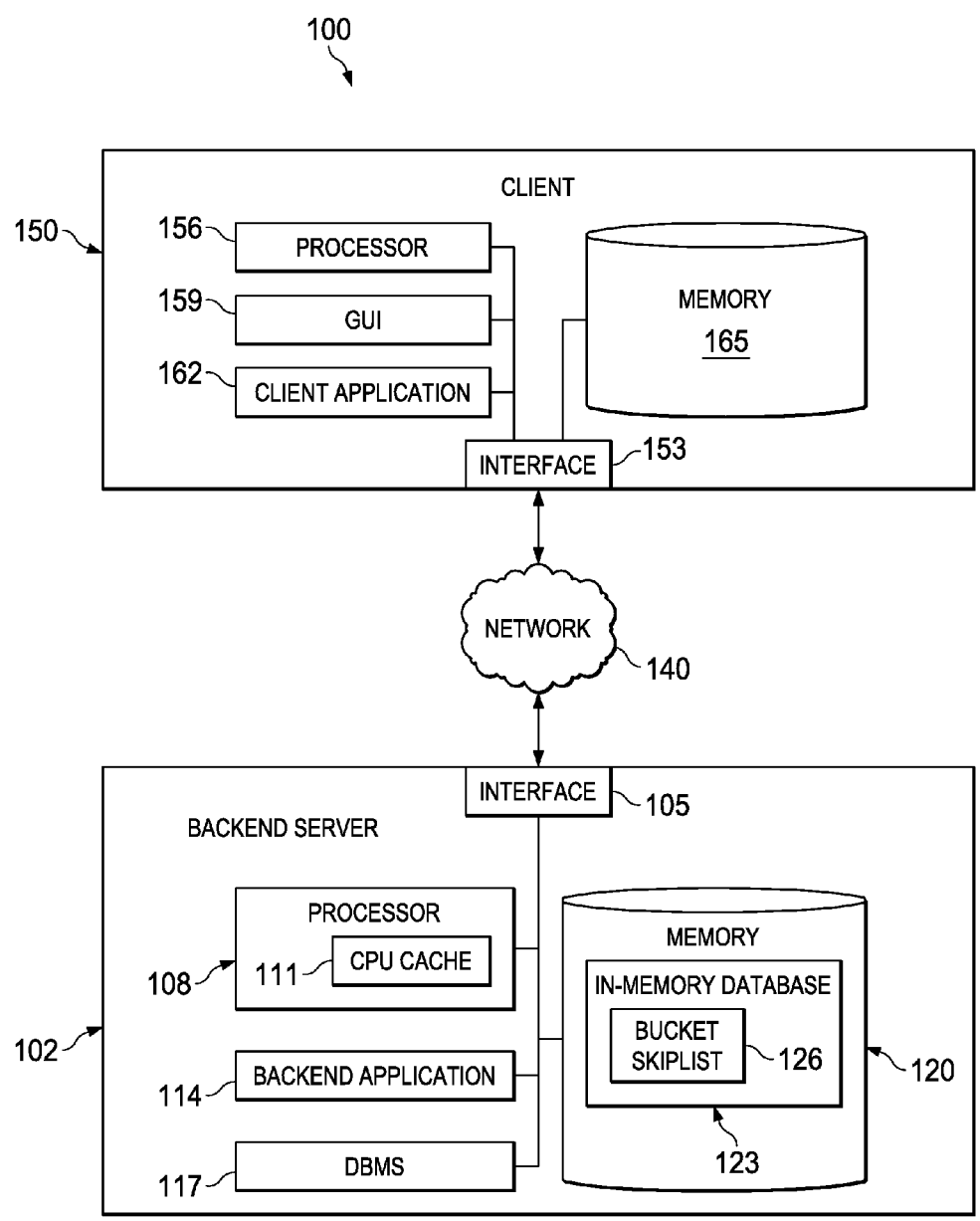
FIG. 1 is a block diagram illustrating an example system for providing and interacting with a bucket skiplist.

The present disclosure describes a system for providing a bucket skiplist. Skiplists in general represent generalizations of a linked list, with links between a plurality of levels or layers. The bottom level is an ordinary ordered linked list that includes each item in the linked list. Each higher layer includes a subset of elements from the immediately lower list and can act as an "express lane" for the lists below. An element at level i appears in layer i+1 with some fixed probability p (e.g., ½ or ¼). In some instances, this probability p can be maintained by a coin flip algorithm or random number generation calculation. Using such calculations, on average, each element appears in 1/(1-p) lists. While retaining the simplicity of linked lists, the average performance of the skiplists can be O(log n), with n being the number of elements included within the skiplist.

A search for a target element begins at the head element in the top list (at the highest level) and proceeds horizontally until the current element is greater than or equal to the target. If the current element is equal to the target, it has been found. If the current element is greater than the target, or the search reaches the end of the linked list on the current level, the procedure is repeated after returning to the previous element and dropping down vertically to the next lower list. The expected number of steps in each linked list is at most 1/p, which can be seen by tracing the search path backwards from the target until reaching an element that appears in the next higher list or reaching the beginning of the current list. Therefore, the total expected cost of a search is $(\log_{1/p} n)/p$, which is O(log n) when p is a constant. By choosing different values of p, it is possible to trade search costs against storage costs.

In traditional skiplists, each element or node is associated with only a single value. In such instances, inserts are handled similar to lists. When an insert position is found, a new key is created and all connectors to the predecessor and successor entries are adopted. In many cases, multiple levels of the skiplist may need to be updated. Further, all nodes store a single value and are spread across memory, which can require multiple calls to different locations within the associated memory structure. Further, no memory prefetching is available due to the distribution of values across the memory structure. The expense of visiting each node may further provide disadvantages, as no particular link other than the pointer to the predecessor and successor nodes may be available at a particular node. Still further, due to the linked structure of traditional skiplists, skiplists are not cache optimal.

The present disclosure describes an updated skiplist structure called a bucket skiplist. In the bucket skiplist, each node on the skiplist can include a bucket storing one or more values. Each bucket is capable of storing a plurality of values. By storing multiple values on a single node, searches and inserts can become less expensive, and cache-related efficiencies can be realized. By storing values together within a single node, those values can be read and stored in a CPU cache as a cache line. Further, the size of these buckets can be optimized to take full advantage of the CPU cache and its available memory. Operations performed on a cache line are very fast as compared to data read throughout various locations in memory as used in traditional skiplists. Further, the cache usage of the plurality of values can reduce cache misses while providing additional speed to operations performed when inserting new values into the bucket skiplist. Using the cache line, operations related to shifting values in a particular bucket can be performed directly at the CPU, providing a significant increase in skiplist insert efficiency and speed. Further, the bucket skiplists provide efficient construction and destruction of buckets within the skiplist. Further, during iterations over leafs (nodes) and their buckets, memory prefetching is made much more efficient due to the buckets.

To perform the searches and insertions in the bucket skiplist, similar operations as those for traditional skiplists are performed. The correct location is found by traversing the bucket skiplist and identifying where on the lowest level a particular is or should be located. However, in the bucket skiplist, each node can be associated with a plurality of values. Those values are sorted in an ascending order similar to the normal skiplist, although several values are included in a single node. The buckets in a particular skiplist may have a particular depth or storage capacity. In some instances, the depth of the bucket may be selected to fit within a CPU cache size, thereby allowing the values to be placed into the CPU's cache for quicker and more efficient calculations. The present disclosure describes example searching and insertion operations, including how buckets are treated when the storage capacity of a particular bucket is full and a new value is to be inserted between at least one pair of values currently stored within the bucket.

Turning to the illustrated embodiment, FIG. 1 is a block diagram illustrating an example system 100 for providing and interacting with a bucket skiplist. As illustrated in FIG. 1, system 100 is a client-server system capable of providing and interacting with a bucket skiplist 126 described herein. Although illustrated as a client-server system, any suitable system could be used, including a system comprising a single computer (e.g., client 150 or backend server 102) storing a bucket skiplist, or a cloud-based system accessible via a wired or wireless connection.

Specifically, system 100 as illustrated includes or is communicably coupled with a client 150, backend server 102, and network 140. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, backend server 102 may be any computer or processing device such as, for example, a blade server, general-purpose personal computer (PC), Mac®, workstation, UNIX-based workstation, or any other suitable device. Moreover, although FIG. 1 illustrates backend server 102 as a single system, backend server 102 can be implemented using two or more systems, as well as computers other than servers, including a server pool. In other words, the present disclosure contemplates computers other than general-purpose computers, as well as computers without conventional operating systems. Further, illustrated backend server 102 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, backend server 102 may be any suitable backend computing server or system storing a bucket skiplist 126 as described herein. The backend server 102 is described herein in terms of responding to requests from client 150 as related to the bucket skiplist 126, which itself may be associated with one or more backend applications 114. However, backend content server 102 may, in some implementations, be a part of a larger system providing additional functionality. For example, backend server 102 may be part of an enterprise business application or application suite providing one or more of enterprise relationship management, content management systems, customer relationship management, and others.

As illustrated, backend server 102 includes an interface 105, a processor 108, a backend application 114, a database management system (DMBS) 117, and memory 120. In general, the backend server 102 is a simplified representation of one or more systems and/or servers that provide the described functionality, and is not meant to be limiting, but rather an example of the systems possible.

The interface 105 is used by the backend server 102 for communicating with other systems in a distributed environment—including within the environment 100—connected to the network 140, e.g., client(s) 150 and other systems communicably coupled to the network 140. Generally, the interface 105 comprises logic encoded in software and/or hardware in a suitable combination and operable to communicate with the network 140. More specifically, the interface 105 may comprise software supporting one or more communication protocols associated with communications such that the network 140 or interface's hardware is operable to communicate physical signals within and outside of the illustrated environment 100.

Network 140 facilitates wireless or wireline communications between the components of the environment 100 (i.e., between the backend server 102 and client(s) 150, between clients 150, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11ac/ad,/af/a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the backend server 102 includes a processor 108. Although illustrated as a single processor 108 in FIG. 1, two or more processors may be used according to particular needs, desires, or particular implementations of the environment 100. Each processor 108 may be a central processing unit (CPU), an application-specific integrated circuit (ASIC), a field-programmable gate array (FPGA), or another suitable component. Generally, the processor 108 executes instructions and manipulates data to perform the operations of the backend server 102. Specifically, the processor 108 executes the algorithms and operations described in the illustrated figures, including the operations performing the functionality associated with the backend server 102 generally, as well as the various software modules (e.g., the backend application 114), including the functionality for sending communications to and receiving transmissions from client(s) 150.

As illustrated, processor 108 includes a CPU cache 111. The CPU cache 111 is a cache used by the processor 108 to reduce the average time to access data from the main memory. The cache is a smaller, faster memory which stores copies of the data from frequently used main memory locations. In this example, the CPU cache 111 can store and access the values included in a particular bucket within the bucket skiplist 126. Those values can be added to the CPU cache to allow for fast access and processor upon the data. Data is transferred between memory 120 and cache in blocks of fixed size referred to as cache lines. When a cache line is copied from memory 120 into the CPU cache 111, a cache entry is created. The cache entry will include the copied data as well as the requested memory location. When the processor 108 needs to read or write a location in main memory, it first checks for a corresponding entry in the cache. The cache 111 checks for the contents of the requested memory location in any cache lines that might contain that address. If the processor finds that the memory location is in the cache, a cache hit has occurred. However, if the processor does not find the memory location in the cache, a cache miss has occurred. In response to a cache hit, the processor 108 immediately reads or writes the data in the cache line. In response to a cache miss, the cache 111 allocates a new entry and copies in data from main memory, then the request is fulfilled from the contents of the cache 111. The solution described herein can greatly reduce the number of cache misses by storing the value information for a particular bucket in the CPU cache 111.

The backend application 114 represents an application, set of applications, software, software modules, or combination of software and hardware used to perform operations related to interacting with the bucket skiplist 126. For example, the information stored in the bucket skiplist 126 may be associated with and/or relevant to the backend application 114, such that the backend application 114 stores information in or requests information from the bucket skiplist 126. In the present solution, the backend application 114 can perform operations including receiving requests for portions of the bucket skiplist 126, evaluating the request, and interacting with the DBMS 117 to access the bucket skiplist 126. Additional modules and functionality may be included in alternative implementations.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The DBMS 117 is a software application that can interact with users, applications, and the database 123 itself to retrieve, update, delete, and analyze data. DBMS 117, in particular, is an application specifically designed to manage and interact with an in-memory database such as the in-memory database 123 stored in memory 120. For example, the DBMS 117 may be able to interpret standard-based requests, such as Structured Query Language (SQL) commands, and perform the actions associated therewith upon the databases and tables with which it is associated (e.g., the bucket skiplist 126). The DBMS 117 may be associated with one or more other applications (e.g., the backend application 114), or may be a standalone application.

As illustrated, backend server 102 includes memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including the bucket skiplist 126, financial and/or business data, user information, administrative settings, password information, caches, applications, backup data, repositories storing business and/or dynamic information, and any other appropriate information including any parameters, variables, algorithms, instructions, rules, constraints, or references thereto associated with the purposes of the backend application 114 and/or backend server 102. Additionally, the memory 120 may store any other appropriate data, such as VPN applications, firmware logs and policies, firewall policies, a security or access log, print or other reporting files, as well as others. For example, illustrated memory 120 includes in-memory database 123, which in turn is illustrated as storing the bucket skiplist 126.

In-memory database 123 is a database that primarily relies on main memory for computer data storage. It is contrasted with database management systems that employ a disk storage mechanism. Main memory databases are faster than disk-optimized databases since the internal optimization algorithms are simpler and execute fewer CPU instructions. Accessing data in memory eliminates seek time when querying the data, which provides faster and more predictable performance than disk. While illustrated as an in-memory database, however, in-memory database 123 may be any type of database, including a relational database stored in disk storage. In-memory database 123 stores the bucket skiplist 126 described herein.

Client 150 may be any computing device operable to connect to or communicate with backend server 102, other clients (not illustrated), or other components via network 140, as well as with the network 140 itself, using a wireline or wireless connection, and can include a desktop computer, a mobile device, a tablet, a server, or any other suitable computer device. In general, client 150 comprises an electronic computer device operable to receive, transmit, process, and store any appropriate data associated with the environment 100 of FIG. 1.

As illustrated, client 150 includes an interface 153, a processor 156, a graphical user interface (GUI) 159, a client application 162, and memory 165. Interface 153 and processor 156 may be similar to or different than the interface 105 and processor 108 described with regard to backend server 102. In general, processor 156 executes instructions and manipulates data to perform the operations of the client 150. Specifically, the processor 150 can execute some or all of the algorithms and operations related to requesting information associated with backend application 114 and/or the bucket skiplist 126, including the operations performing the functionality associated with the client application 162 and the other components of client 150. Similarly, interface 153 provides the client 150 with the ability to communicate with other systems in a distributed environment—including within the environment 100—connected to the network 140.

Client 150 executes a client application 162. The client application 162 may operate with or without requests to the backend server 102—in other words, the client application 162 may execute its functionality without requiring the backend server 102 in some instances, such as by accessing a bucket skiplist (not illustrated) stored locally on the client 150. In others, the client application 162 may be operable to interact with the backend server 102 by sending requests via network 140 to the backend server 102 for particular portions of the bucket skiplist 126. In some implementations, the client application 162 may be a standalone web browser, while in others, the client application 162 may be an application with a built-in browser or network-capable operations. The client application 162 can be a web-based application or a standalone application developed for the particular client 150. For example, the client application 162 can be a native iOS application or a desktop application for laptops, as well as others. In some instances, client application 162 may be an agent or client-side version of the backend application 114.

Memory 165 may be similar to or different from memory 120 of the backend server 102. In general, memory 165 can store information associated with the client 150 and/or the client application 162. In some instances, memory 165 can store a local version of the bucket skiplist 126, or another bucket skiplist.

The illustrated client 150 is intended to encompass any computing device such as a desktop computer, laptop/notebook computer, mobile device, smartphone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operation of the client application 162 or the client 150 itself, including digital data, visual information, or a GUI 159, as shown with respect to the client 150.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
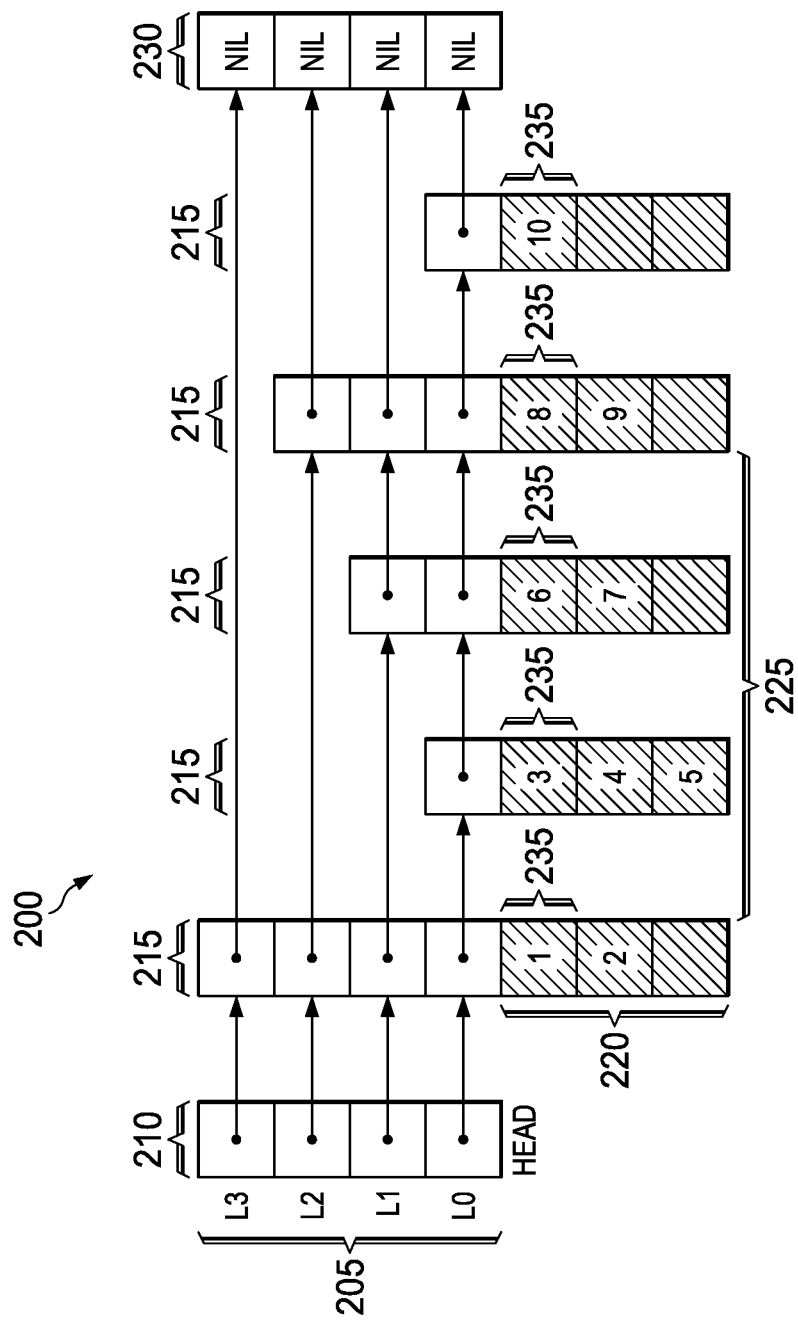
FIG. 2 is an illustration of an example bucket skiplist.

FIG. 2 is an illustration of an example bucket skiplist 200. As described, a bucket skiplist represents a modified version of a traditional skiplist, wherein each node in the bucket skiplist can be associated with more than one value, where the values are stored in a bucket associated with the node.

The illustrated bucket skiplist 200 includes four levels 205 (i.e., L0, L1, L2, and L3), each representing a linked list. At the bottom or lower level L0, an entry exists for each node included in any of the levels. As one moves up a level (e.g., to L1), a subset of the nodes in the prior level may be included in the current level. This can be continued until the highest level (e.g., L3). In the illustrated skiplist 200, the highest level L3 is empty of nodes. When new nodes are created, they may be provided a relatively random height. For example, all nodes must have a height of at least one such that they are included as part of the lowest level L0. For each ascending level, however, an algorithm providing a probability determining the height of each node may be applied. The possible height of a particular node is limited to the total size or maximum height of the skiplist 200. The probability defining the distribution may be determined and applied to provide a well-distributed structure, allowing for significant speed and functionality advantages.

Each linked list begins with a head node 210. The head node 210 is illustrated at the left side of each level of the skiplist. The head node 210 has a height equal to the maximum height of the skiplist and includes no bucket. The head node 210, at each level, points to the next nodes in that level. If no nodes with buckets exist in that level, the head node 210 points to NIL 230, which represents the end of the current list and level. The head node 210 is the beginning of each and every search and insert operation, with the search beginning at the highest level available.

A node 210, other than the head node or the NIL node, is a structure containing a bucket 220 and points to the next node within each level (i.e., links 225). The linked list at each level starts at the head node 205 and includes links 225 between the nodes 215 and from the last node 215 to the NIL node 230. Each node has a random height determined at the time the node is added. For example, in FIG. 2, the node with a bucket storing values "1" and "2" has a height of 4, while the node with a bucket storing the values "3," "4," and "5" has a height of 1. Once the height of a particular node 210 is defined, that value will not change. The height defines how many levels a particular node 210 is associated with and in which the node 210 will be included.

The buckets 220 associated with each node 210 hold the set of values that are associated with particular nodes 210. The values stored in each bucket 220 can be stored together in a particular memory location. Buckets 220 have a defined maximum size that determines how many values can be in a particular bucket. The actual number of values in a particular bucket is a fill count. Each value within a bucket 220 is at a particular position or location within the bucket (e.g., for the node with a first value of "1," value "1" is at position 1 and value "2" is at position 2, while position 3 is empty). The first value 235 in each bucket is set during creation of the bucket 220 and the associated node 215. That first value 235 is the lowest value of the bucket 220 and will not be changed by a shift or split operation described herein. If the skiplist 200 is reconstructed, the first value 235 of particular buckets 220 may be changed, but will not be modified during normal operations.

Figure 3A:
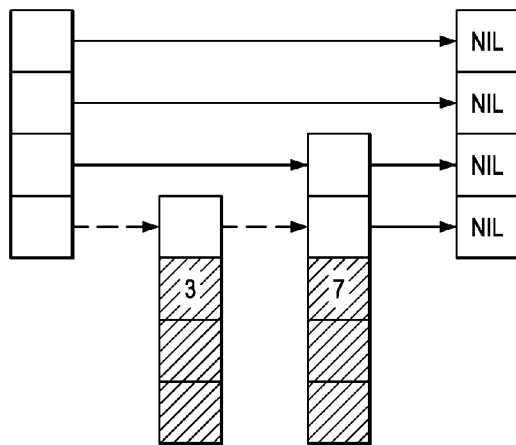
FIGS. 3A-E are illustrations of an example bucket skiplist with various operations performed thereon.

FIGS. 3A-E are illustrations of an example bucket skiplist with various operations performed thereon. FIG. 3A represents a starting bucket skiplist having two nodes containing a single value each. In a first node having a height of 1, the value "3" is stored in the first position, along with two empty value places. In a second node having a height of 2, the value "7" is stored in the first position. The highest two levels of the bucket skiplist have no nodes, with the third level having a connection from the head node to the second node associated with the value "7." The lowest level includes links to both the node associated with the value "3" and the node associated with the value "7."

In a first example, the value "5" is to be inserted into the skiplist. To insert the value "5" into the bucket skiplist, the correct node where the insertion is to be made is found. The operations associated with finding the insertion location may be similar to those associated with a search for value "5." However, since the value "5" is not in the skiplist visualized in FIG. 3A, only a location for insertion is found instead of the value "5" itself.

Figure 3B:
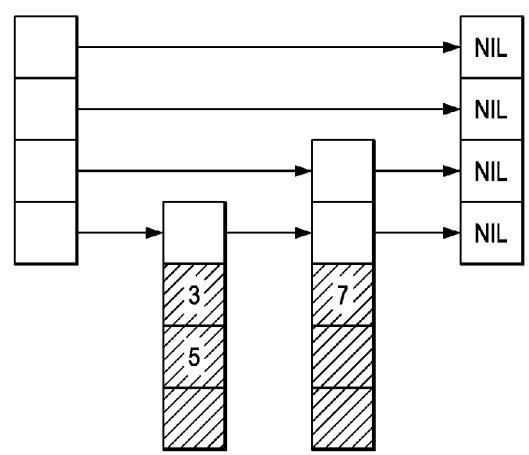

Starting at the head node at the highest level of the skiplist, the skiplist is traversed. Since no nodes are associated with that level or the level below, the traversal arrives at the second from the bottom level. At that level, a node with the first value of "7" is hit during the traversal. Since this value is relatively higher than the value of "5" to be added, the traversal returns to the head node on the lowest level. The node with the first value of "3" is reached. Since that value is lower than the value to be added, the traversal continues to check if another lower first value is associated with another node. The traversal again reaches the node with the first value of "7." Since the value is relatively higher than the value to be inserted, the operations understand that, if possible, the value to be inserted should be added to the node with the first value of "3." Because the node with the first value of "3" has two empty positions or locations within its bucket, the value "5" can be added to second location in the bucket as illustrated in FIG. 3B. Because the location of the addition is after the values already within the bucket, the addition can be a simple appending of the value "5" to the bucket. Because no new nodes are added, no links between nodes need to be adjusted.

Figure 3C:
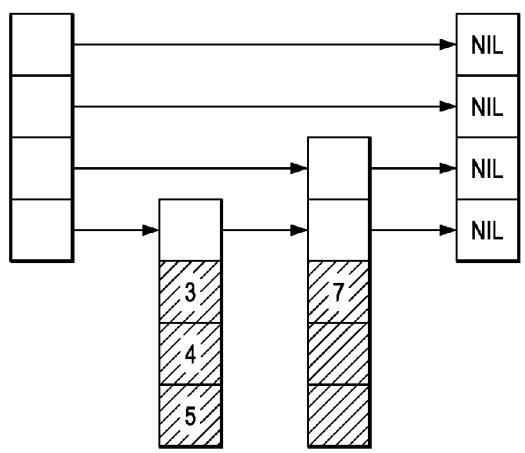

In a next example, the value "4" is to be inserted into the skiplist. Performing a similar traversal as described above, a determination is made that the correct location for the insertion is within the node with the first value of "3." A determination is now made as to where within the bucket (now containing both "3" and "5") the new value is to be added. To find the position to insert a new value within a particular bucket, a comparison of the new value to the existing values within the bucket is performed. In the current example, the new value "4" is compared to the first value of "3." Since "4" is greater than "3," the next value "5" is compared to "4." Since "4" is between "3" and "5," the location for the insertion should be after "3" and before "5." Since there is an empty location available within the bucket (i.e., the third position), the value "5" can be shifted back to the third position and the value "4" can be inserted into the second position previously occupied by the value "5." Because the shift takes place within a single bucket, no links between nodes need to be adjusted. Further, if the bucket contents are loaded into a CPU cache, the CPU can internally manage the bucket and perform the operations, performing the functions at a high efficiency and speed. FIG. 3C illustrates the updated bucket skiplist after the value "5" is shifted and the value "4" is inserted.

Figure 3D:
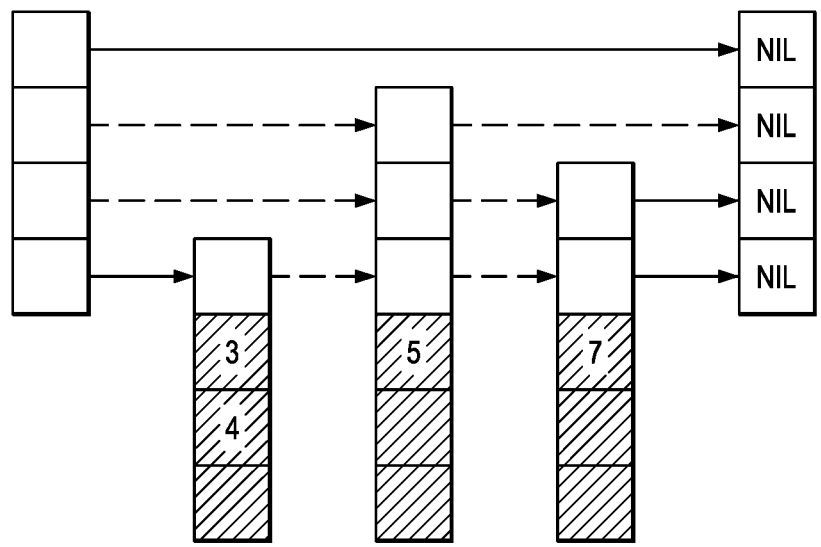
Figure 3E:
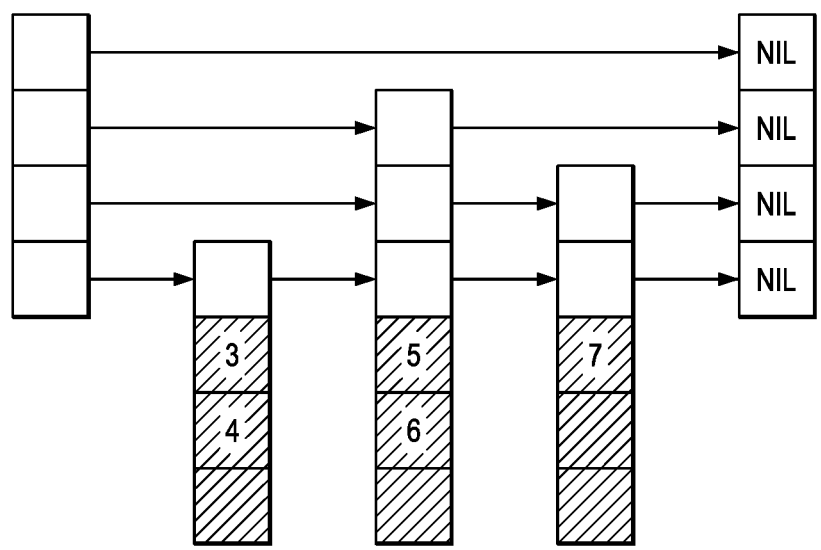

In a next example, a value "6" is added to the bucket skiplist. In response to the traversal to identify where the new value is to be inserted, the result identified the node with the first value of "3" as the correct current node in which the new value should be added if additional locations are available. The examination of the bucket returns that no locations are available. In the current example, a decision is made to first create a new node and shift the value "5" into that new node to begin the insertion of the value "6." This decision may be made based on the relative closeness between the value before the new value "6" and the next higher value "7." Alternatively, in instances where a new value insertion cannot be added to an existing node based on no available space within the corresponding bucket, a shift of the last value in that bucket into a new node may be performed to allow for easier insertions at a later time. In other instances, and contrary to the example here, the new value "6" may be added as the first value in a bucket associated with a new node. Returning to the current example, FIG. 3D shows the updated bucket skiplist after the new node with the first value "5" is created. In addition to adding the new node, a height for the new node is selected (e.g., via random determination or probability). Here, the new node has a height of 3, such that the lowest 3 levels are required to update the links between nodes. At the second highest level, the link from the head node to the NIL node is updated by linking the head node to the node with a first value of "5." Similar adjustments are made as illustrated to the second lowest and lowest levels of the skiplist. Once the new node is created and the links are updated, an insertion of the value "6" is performed. A comparison of the new value to the values associated with the new node is performed, and the value "6" is inserted after the value "5" as illustrated in FIG. 3E.

Figure 4:
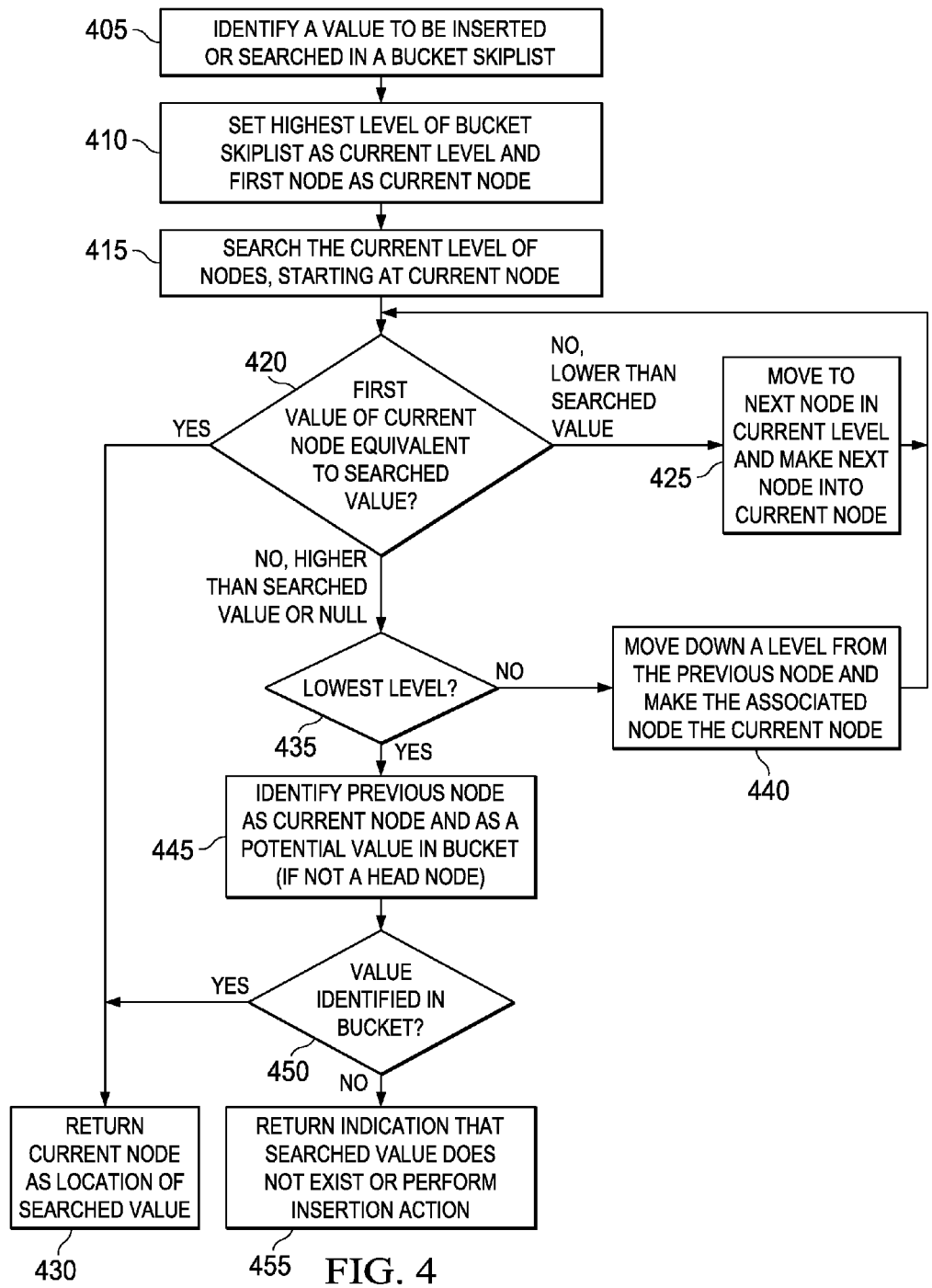
FIG. 4 is a flowchart of example operations for searching and inserting values within a bucket skiplist.

FIG. 4 is a flowchart of example operations 400 for searching and inserting values within a bucket skiplist. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a value to be inserted or searched in a bucket skiplist is identified. The value may be identified in response to a search or insert request as received from a particular user or application.

At 410, the highest level of the bucket skiplist is set as the current level, and the first node, or the head node, in the highest level is set as the current node. At 415, the current level of nodes, starting at the current node, is compared to the identified value. At 420, a determination is made as to whether the first value in a bucket associated with the current node is equivalent to or matches the searched value. In the illustrated method 400, the determination may return one of three results. In a first result, the first value in the bucket of the current node may be lower than the searched value. In such instances, method 400 continues at 425, wherein the search process moves to the next node in the current level and makes that node the current node. Method 400 then returns to 420 and continues the comparison of the first value of the new current node to the searched value.

In a second result of the determination at 420, the first value of the current node may be equivalent to the searched value. In such instances, method 400 moves from 420 to 430, and the current node is returned as the location of the searched value.

In a third result of the determination at 420, the first value of the current node may be higher than the searched value or the value of the current node may be NULL or NIL. Before continuing, a determination is made at 435 as to whether the current level is the lowest level in the skiplist. If not, at 440, the search operation moves down a level from the previous node and makes that node—in the level below—the current node. Method 400 then returns to 420 and continues the comparison of the first value of the new current node to the searched value. If the result of the determination at 435 is that the current level is the lowest level in the skiplist structure, then method 400 continues at 445. At 445, the previous node is identified as a potential node associated with the searched value. In some instances, and not illustrated in FIG. 4, where the previous node is a head node at this instance, method 400 can continue to 460 as the value will not be included at the head node since the head node does not have an associated bucket. Next, at 450, a comparison of the values within the bucket of the potential bucket node for the searched value is performed. If the value is found, method 400 moves from 450 to 430, where the current node is returned as the location of the searched value. If the searched value is not found within the bucket, or no bucket is associated with the node, method 400 moves from 450 to 455. The operation at 455 depends on whether the searched value is being searched or inserted into the skiplist. If the value is being searched only, at 455 an indication is returned that indicates the searched value does not exist in the skiplist. If, however, the searched value is being inserted into the skiplist, in response to determining that the value is not in the bucket of the current node, an insertion action can be performed at 455. Details of the insertion action are described in FIG. 5.

Figure 5:
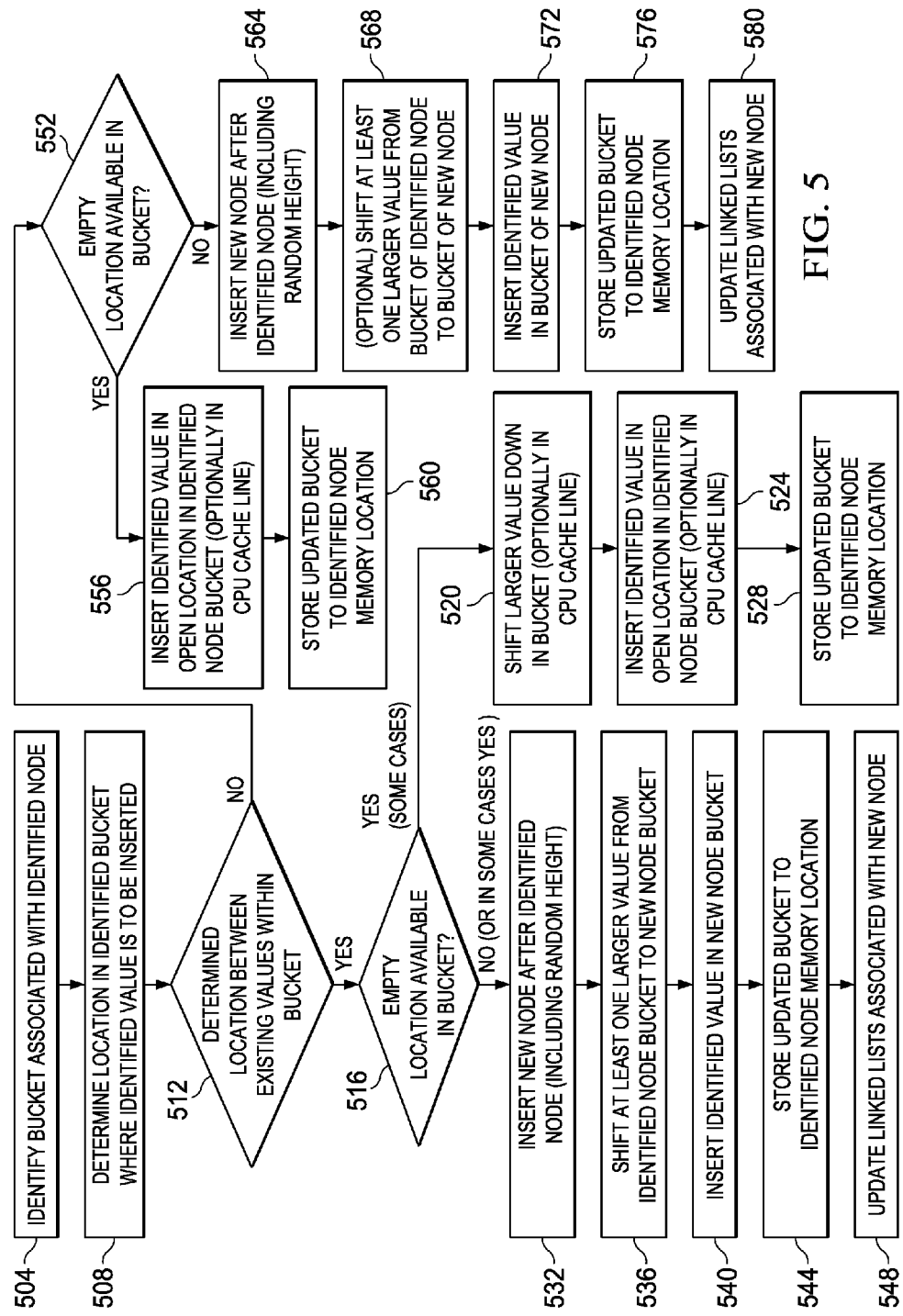
FIG. 5 is a flowchart of example operations associated with performing value inserts within particular buckets of a bucket skiplist.

FIG. 5 is a flowchart of example operations 500 associated with performing value inserts within particular buckets of a bucket skiplist. At 504, a bucket associated with the identified node is identified. The node is identified as described in method 400 (i.e., identified at 445). At 508, a determination of a position within the identified bucket where the identified value is to be is performed. The determination compares the identified value to the values in the bucket, beginning with the second value in the bucket (as the first value is already known to be lower than the identified value). The determined location may be between or after the values already in the bucket. At 512, a determination is made as to whether the determined location is between existing values within the bucket. If so, method 500 continues at 516. If not, method 500 continues at 552.

In response to determining that the location is between existing values, at 516 a determination is made as to whether any empty locations or positions are available within the bucket. If yes, then method 500 continues at 520, where the larger value (or values) in the bucket is shifted down to the next available position. At 524, the identified value is inserted in the now-open location in the bucket. At 528, the updated bucket can be stored to the identified node's memory location. In some instances, the operations performed may be performed by the CPU cache, such that the contents of the bucket are transferred from memory to the CPU cache. By doing so, the operations in analyzing, shifting, and inserting the identified value can be performed more efficiently and faster than if they were performed directly in the skiplist.

Returning to 516, if a determination is made that no empty locations are available in the bucket, method 500 continues to 532. In some cases, even in the case where an empty location is available, method 500 may move to 532 after the determination at 516, such as for efficiencies' sake to provide a better distribution and a more efficient skiplist. When empty locations are available, the decision to split a bucket may be made. For example, consider a bucket of 10 values and no empty locations, the bucket filled with [1, 10, 20, 30, 40, 50, 60, 70, 80, 90]. In one instance, the value 22 is to be inserted. This can provide several options for splitting the bucket to allow the new value to inserted. In one implementation, the bucket can be split at value 50 (in the middle of the bucket), with 50 becoming the lowest value in a new bucket added in the node after the node with a first value of 1. The new buckets are [1, 10, 20, 30, 40] and [50, 60, 70, 80, 90]. The value 22 can then be added to the first bucket by shifting the values of 30 and 40 and inserting the value 22 in the empty space between 20 and 30. In a second implementation, the bucket of 10 values can be split at value 30 (i.e., the location where value 22 is to be added). In that instance, the new buckets are [1, 10, 20] and [30, 40, 50, 60, 70, 80, 90]. Without the need to perform further shifting, the value 22 can be added after the value 20 in the first bucket. The first implementation is shown in FIG. 3D, and provides fewer nodes with better-filled buckets—that is, every split bucket is at least half filled. In an example according to the second example implementation, the values 86, 85, 84, 83, 82, and 81 are added sequentially. Performing the operations using the second implementation, the result would be seven (7) buckets containing [1, 10, 20, 30, 40, 50, 60, 70, 80, 81], [82], [83], [84], [85], [86]. Using the operations of the first implementation, the result is three (3) buckets containing [1, 10, 20, 30, 40],]50, 60, 70, 80, 81, 82], and [83, 84, 85, 86, 90], respectively.

At 532, a new node is inserted after the identified node. The new node is provided a random height based on a predefined algorithm or random determination.

At 536, at least one value larger than the identified value is shifted from the bucket of the identified node to the bucket of the newly created node. The lower of those values is made as the first value in the new node. At 540, the identified value is inserted into the bucket of the new node. At 544, the updated bucket of the identified node is stored to the memory location of the identified node to maintain the updated values. At 548, the linked lists at each level where the new node is included (e.g., based on its defined height) are updated. This includes rewriting and updating the pointers in the predecessor and successor nodes to reflect the new structure.

Returning to the determination at 512, where the determined location in the identified bucket is not in between values stored in the bucket but is instead after the values, method 500 moves to 552. At 552, a determination is made as to whether any empty locations are available at the end of the identified bucket. If empty locations are available, method 500 continues at 556, where the identified value is inserted into the first open location in the bucket of the identified node. At 560, the updated bucket can be stored to the memory location of the identified node. No changes to the linked lists other than the bucket update are necessary.

Returning to the determination at 552, if it is determined that no empty locations are available within the bucket, method 500 moves to 564. At 564, a new node is inserted after the identified node and is provided a height. At optional 568, at least one larger value can be shifted from the bucket of the identified node to the bucket of the new node. This can be done when the shift may provide additional efficiencies to the skiplist. At 572, the identified value is inserted into the bucket of the new node at the appropriate location. Where one or more nodes from the identified node are shifted to the new node, a comparison of the identified value to the shifted node may be performed to determine which value should be the first value of the new node. At 576, the updated bucket of the identified node is stored to the memory location of the identified node to maintain the updated values. At 580, the linked lists at each level where the new node is included (e.g., based on its defined height) are updated. This includes rewriting and updating the pointers in the predecessor and successor nodes to reflect the new structure.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for operating on a data structure comprising:
   identifying a value to be inserted into a skiplist, the skiplist comprising a data structure for referencing a plurality of ordered nodes, the data structure having a plurality of linked lists, each node representing at least one memory block, wherein each node is associated with a bucket including a set of ordered values, and wherein a first value in each bucket of each node is a relatively lowest value in the bucket, and wherein each bucket includes a plurality of locations available to store values;
   comparing the value to be inserted to the first value in each bucket to identify a particular node, associated with a particular bucket, in which the value to be inserted may be located;
   in response to determining that the first value of the particular node is not the same as the value to be inserted, comparing the value to be inserted with the ordered values in the particular bucket of the particular node;
   identifying a particular location within the particular bucket of the particular node to insert the value, wherein no empty locations remain available within the bucket of the identified particular node;
   identifying a location storing a relatively higher value in the particular bucket to initiate a bucket split;
   inserting a new node into the skiplist after the particular node;
   moving the relatively higher value and any subsequent values within the particular bucket into a bucket associated with the inserted new node; and
   inserting the value into a first empty location within the particular bucket.

2. The method of claim 1, wherein each bucket includes the same number of locations available to store values.

3. The method of claim 1, wherein the identified particular location within the bucket is an empty location within the bucket of the particular node, wherein the empty location is after a relatively lower value within the bucket, the method further comprising adding the value to be inserted into the empty location.

4. The method of claim 1, further comprising:
   identifying the value to be inserted as already existing within the bucket of the particular node; and
   aborting the insertion of the value into the skiplist.

5. The method of claim 1, further comprising adding connections to the new node in at least the lowest linked list of the skiplist.

6. A system comprising:
   one or more computers; and
   a computer-readable medium coupled to the one or more computers including instructions stored thereon which, when executed by the one or more computers, cause the one or more computers to perform operations comprising:
   identifying a value to be inserted into a skiplist, the skiplist comprising a data structure for referencing a plurality of ordered nodes, the data structure having a plurality of linked lists, each node representing at least one memory block, wherein each node is associated with a bucket including a set of ordered values, and wherein a first value in each bucket of each node is a relatively lowest value in the bucket, and wherein each bucket includes a plurality of locations available to store values;

comparing the value to be inserted to the first value in each bucket to identify a particular node, associated with a particular bucket, in which the value to be inserted may be located;

in response to determining that the first value of the particular node is not the same as the value to be inserted, comparing the value to be inserted with the ordered values in the particular bucket of the particular node;

identifying a particular location within the particular bucket of the particular node to insert the value, wherein no empty locations remain available within the bucket of the identified particular node;

identifying a location storing a relatively higher value in the particular bucket to initiate a bucket split;

inserting a new node into the skiplist after the particular node;

moving the relatively higher value and any subsequent values within the particular bucket into a bucket associated with the inserted new node; and inserting the value into a first empty location within the particular bucket.

7. The system of claim 6, wherein each bucket includes the same number of locations available to store values.

8. The system of claim 6, wherein the identified particular location within the bucket is an empty location within the bucket of the particular node, wherein the empty location is after a relatively lower value within the bucket, wherein the computer-readable medium further includes instructions stored thereon which, when executed by the one or more computers, cause the one or more computers to perform operations comprising adding the value to be inserted into the empty location.

9. The system of claim 6, wherein the computer-readable medium further includes instructions stored thereon which, when executed by the one or more computers, cause the one or more computers to perform operations comprising:
    identifying the value to be inserted as already existing within the bucket of the particular node; and
    aborting the insertion of the value into the skiplist.

10. The system of claim 6, wherein the computer-readable medium further includes instructions stored thereon which, when executed by the one or more computers, cause the one or more computers to perform operations comprising adding connections to the new node in at least the lowest linked list of the skiplist.

11. A computer program product encoded on a tangible, non-transitory storage medium, the product comprising computer-readable instructions for causing one or more processors to perform operations comprising:
    identifying a value to be inserted into a skiplist, the skiplist comprising a data structure for referencing a plurality of ordered nodes, the data structure having a plurality of linked lists, each node representing at least one memory block, wherein each node is associated with a bucket including a set of ordered values, and wherein a first value in each bucket of each node is a relatively lowest value in the bucket, and wherein each bucket includes a plurality of locations available to store values;

comparing the value to be inserted into the first value in each bucket to identify a particular node, associated with a particular bucket, in which the value to be inserted may be located;

in response to determining that the first value in the particular node is not the same as the value to be inserted, comparing the value to be inserted with the ordered values in the particular bucket of the particular node;

identifying a particular location within the particular bucket of the particular node to insert the value, wherein no empty locations remain available within the bucket of the identified particular node;

identifying a location storing a relatively higher value in the particular bucket to initiate a bucket split;

inserting a new node into the skiplist after the particular node;

moving the relatively higher value and any subsequent values within the particular bucket into a bucket associated with the inserted new node; and inserting the value into a first empty location within the particular bucket.

12. The computer program product of claim 11, wherein each bucket includes the same number of locations available to store values.

13. The method of claim 1, wherein moving the relatively higher value and any subsequent values results in at least one empty location within the bucket.

14. The computer program product of claim 11, wherein the identified particular location within the bucket is an empty location within the bucket of the particular node, wherein the empty location is after a relatively lower value within the bucket, wherein the computer-readable medium further includes instructions stored thereon which, when executed by the one or more computers, cause the one or more computers to perform operations comprising adding the value to be inserted into the empty location.

15. The computer program product of claim 11, wherein the computer-readable medium further includes instructions stored thereon which, when executed by the one or more computers, cause the one or more computers to perform operations comprising:
    identifying the value to be inserted as already existing within the bucket of the particular node; and
    aborting the insertion of the value into the skiplist.

16. The computer program product of claim 11, wherein the computer-readable medium further includes instructions stored thereon which, when executed by the one or more computers, cause the one or more computers to perform operations comprising adding connections to the new node in at least the lowest linked list of the skiplist.

* * * * *